United States Patent
Lai et al.

(10) Patent No.: US 6,790,061 B1
(45) Date of Patent: Sep. 14, 2004

(54) TWO-STAGE EJECTION MECHANISM OF CARD CONNECTOR

(75) Inventors: Ming-Chun Lai, Tucheng (TW); Chia-Sheng Su, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 10/684,397

(22) Filed: Oct. 15, 2003

(51) Int. Cl.[7] ............................................. H01R 13/62
(52) U.S. Cl. .................. 439/159; 439/630; 439/310; 439/333
(58) Field of Search ......................... 439/159–160, 439/630–632, 310, 333

(56) References Cited

U.S. PATENT DOCUMENTS

| | | | |
|---|---|---|---|
| 6,537,090 B2 * | 3/2003 | Ozawa | 439/159 |
| 6,592,385 B1 * | 7/2003 | Chen | 439/159 |
| 6,609,919 B2 * | 8/2003 | Ito et al. | 439/159 |
| 6,652,301 B2 * | 11/2003 | Harasawa et al. | 439/159 |
| 6,655,973 B2 * | 12/2003 | Ji et al. | 439/159 |
| 6,669,494 B2 * | 12/2003 | Abe | 439/159 |

* cited by examiner

*Primary Examiner*—Truc Nguyen
(74) *Attorney, Agent, or Firm*—Rosenberg, Klein & Lee

(57) ABSTRACT

The present invention provides a two-stage ejection mechanism of card connector which includes a frame, a slider, a slider pin and a spring. The frame forms a cam member. One end of the slider pin engages moveably with the cam member, the other end engages pivotally with the slider, and the spring can act resilience on the slider. In this way, the two-stage ejection mechanism of card connector is provided with a back and forth movement in the course of loading and unloading the card. Moreover, the slider forms directly a spring pin thereon for contacting and pressing elastically the slider pin, which prevents the spring pin and the slider pin from missing engagement. Thereby the two-stage ejection mechanism can simplify the structure and decrease the making and assembling cost for the card connector by means of the improved structure of the spring pin.

7 Claims, 5 Drawing Sheets

TWO-STAGE EJECTION MECHANISM OF CARD CONNECTOR

BACKGROUND OF THE INVENTION

1. Field of the Invention

The present invention relates generally to a two-stage ejection mechanism of card connector, and more especially to a two-stage ejection mechanism of card connector which provides an improved structure of a spring pin to simplify the structure and decrease the making and assembling cost of the card connector.

2. The Related Art

At present, a variety of cards, such as PCMCIA(Personal Computer Memory Card International Association) card, SD(Secure Digital) card or CF(Compact Flash) card, are used extensively following with a development of computers and peripherals. Further, the card connector, especially the one that utilizes a two-stage ejection mechanism has a correspondingly great development.

In general, the card connector with the two-stage ejection mechanism as mentioned previously, includes a shield, a housing and the two-stage ejection mechanism. The two-stage ejection mechanism comprises a spring, a slider and a slider pin. The slider is provided with a heart-shaped cam groove, and the slider pin engages with the came groove to move back and forth therein. When a card is held in a room which is formed between the shield and the housing, as pushing the card for the first operation, the card can be loaded in the room by means of the movement of the slider pin and a locking structure of the cam groove. Further pushing the card for the second operation, the card can be unloaded from the room by means of the movement of the slider pin and an elasticity of the spring.

When the slider pin moves in the cam groove, in order to prevent the slider from departing from the cam groove to result the two-stage ejection of card connector losing efficacy, the card connector provides a spring pin by means of designing a new single mold to make or cleaving the shield to shape, and the spring pin contacts and presses the slider pin to hinder it from rising upwardly to depart from the cam groove.

As mentioned above, both of two designs for the spring pin in prior art have serious drawbacks. The former results the card connector assembling difficultly and increases the making and assembling cost, but the latter also increases the making cost and results the card connector making complicatedly, further the EMI(Electro-Magnetic Interference) performance of the shield is decreased because of the shield being cleaved.

SUMMARY OF THE INVENTION

Thus, an object of the present invention is to provide a two-stage ejection mechanism of card connector which can avoid the slide pin rising to depart from the cam groove, and assure the EMI performance of the shield, further be provided with a simple structure, a decreased cost and a easy assembling process for the card connector.

To attain the above object, the present invention provides a two-stage ejection mechanism of card connector, which comprises a frame, a slider, a slider pin and a spring. The frame is formed with a cam member therein. The slider, which could slip along a lateral side of the frame, defines a mating portion for engaging with a card. The slider pin includes a pivoting portion, a following portion and an engaging portion. The pivoting portion engages pivotally with the slider. The following portion engages moveably with the cam member and could move back and forth therein. The engaging portion connects the following portion and the pivoting portion therebetween. The spring is located between the frame and the slider to act resilience on the slider. The slider further defines a spring pin, a free end of the spring pin extends a locking portion to contact and press the engaging portion of the slider pin.

As mentioned above, an obvious structure characteristic of the present invention is that the spring pin is directly arranged on the slider. It is not necessary to provide the spring pin by means of designing a new single mold to make or cleaving the shield to shape. In this way, the two-stage mechanism of card connector of the present invention is provided with a simple structure and an easy assembling process. It assures a reliable EMI performance of the shield, and decreases apparently the making and assembling cost simultaneously.

BRIEF DESCRIPTION OF THE DRAWINGS

A detailed explanation of a preferred embodiment of the present invention will be given, with reference to the attached drawings, for better understanding thereof to those skilled in the art.

DETAILED DESCRIPTION OF THE PREFERRED EMBODIMENT

Figure 1:
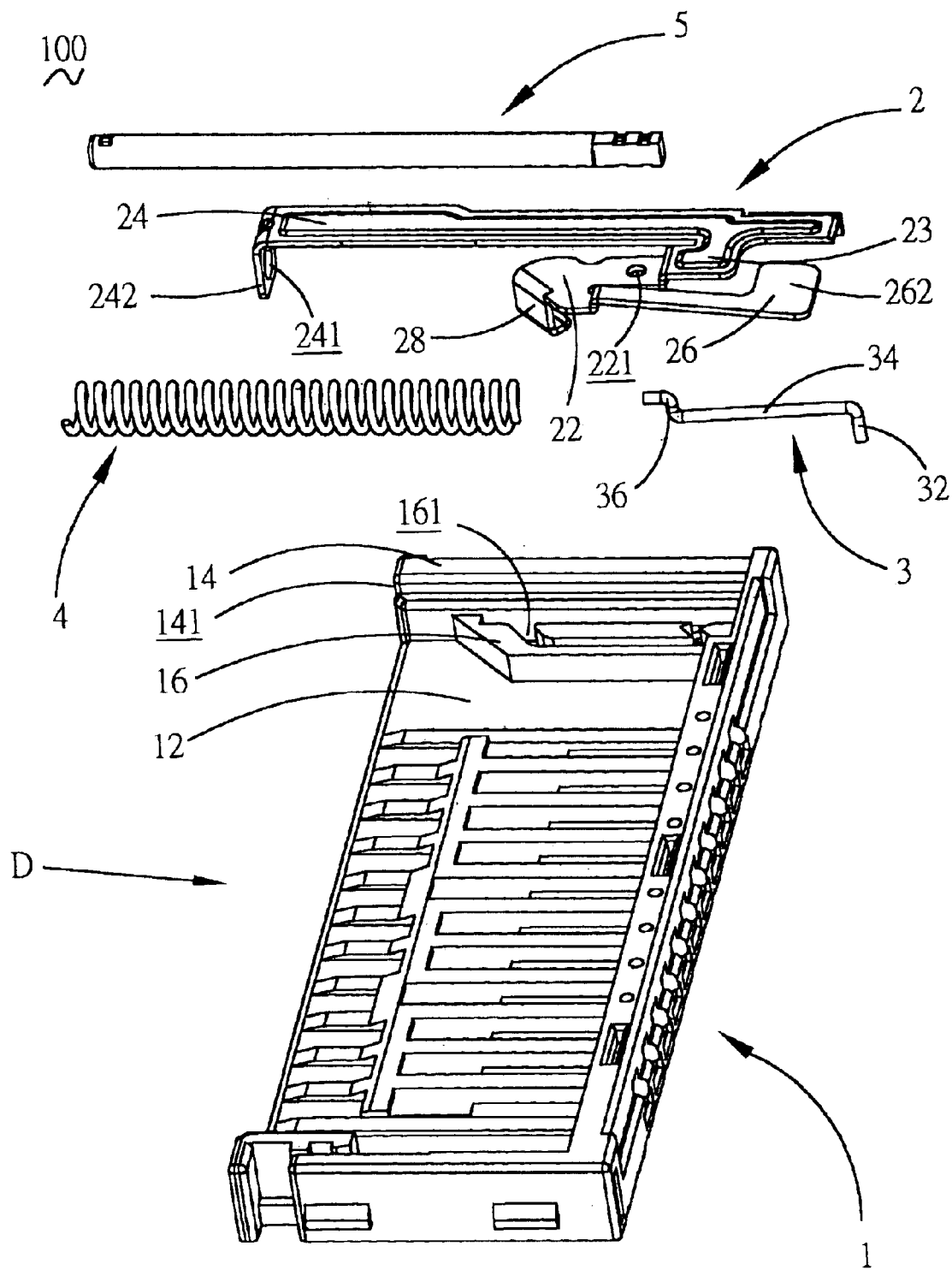
FIG. 1 is an exploded perspective view of a two-stage ejection mechanism of card connector in accordance with the present invention.

With reference to FIG. 1, a two-stage ejection mechanism of card connector, in accordance with the present invention, generally designed with reference numeral 100, comprises a frame 1, a slider 2, a slider pin 3, a spring 4 and a supporting shaft 5.

Figure 2:
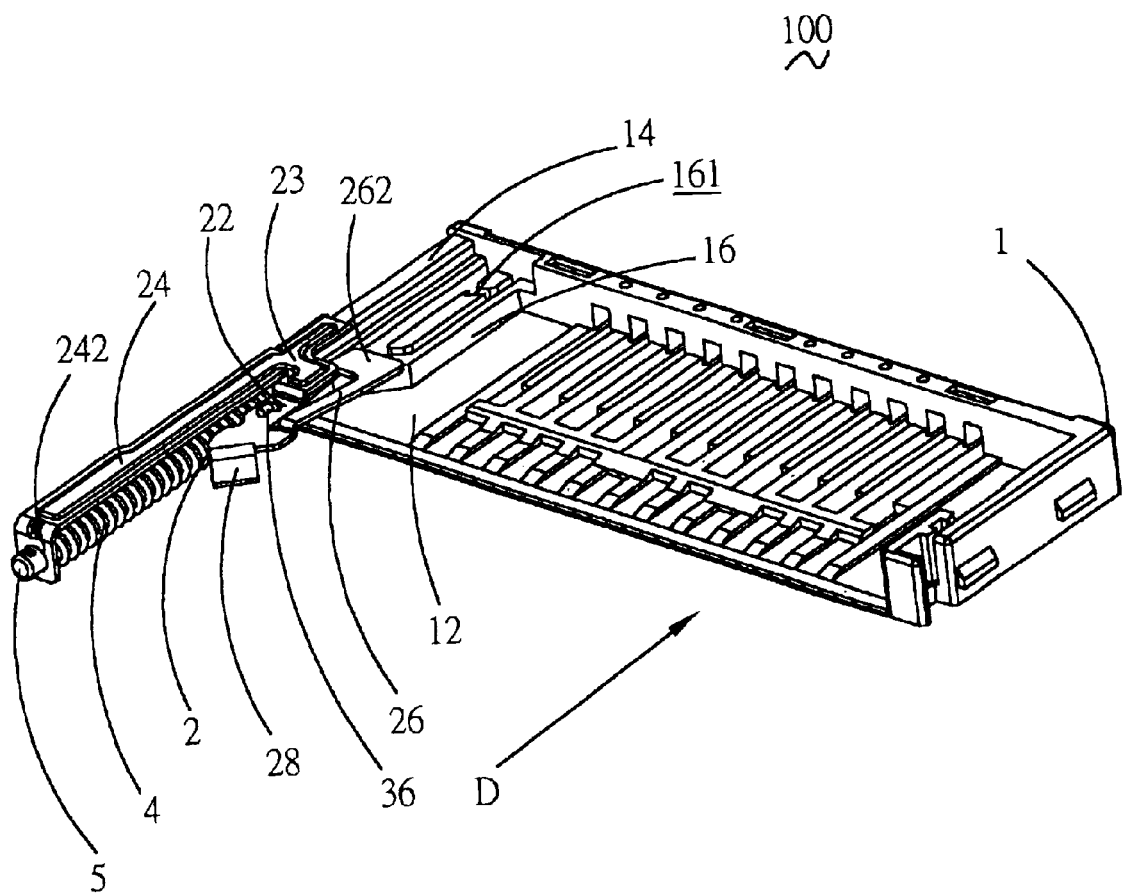
FIG. 2 is an assembled perspective view of the two-stage ejection mechanism of card connector shown in FIG. 1.

Together with reference to FIG. 2, the frame 1 includes a bottom board 12. A guiding wall 14 is formed on one lateral side of the bottom board 12 to extend upwardly, and a holding hole 141 is formed on a bottom end of the guiding wall 14. A cam member 16 is arranged to adjoin the guiding wall 14 on the bottom board 12, and a heart-shaped cam groove 161 is opened in the can member 16.

Figure 5:
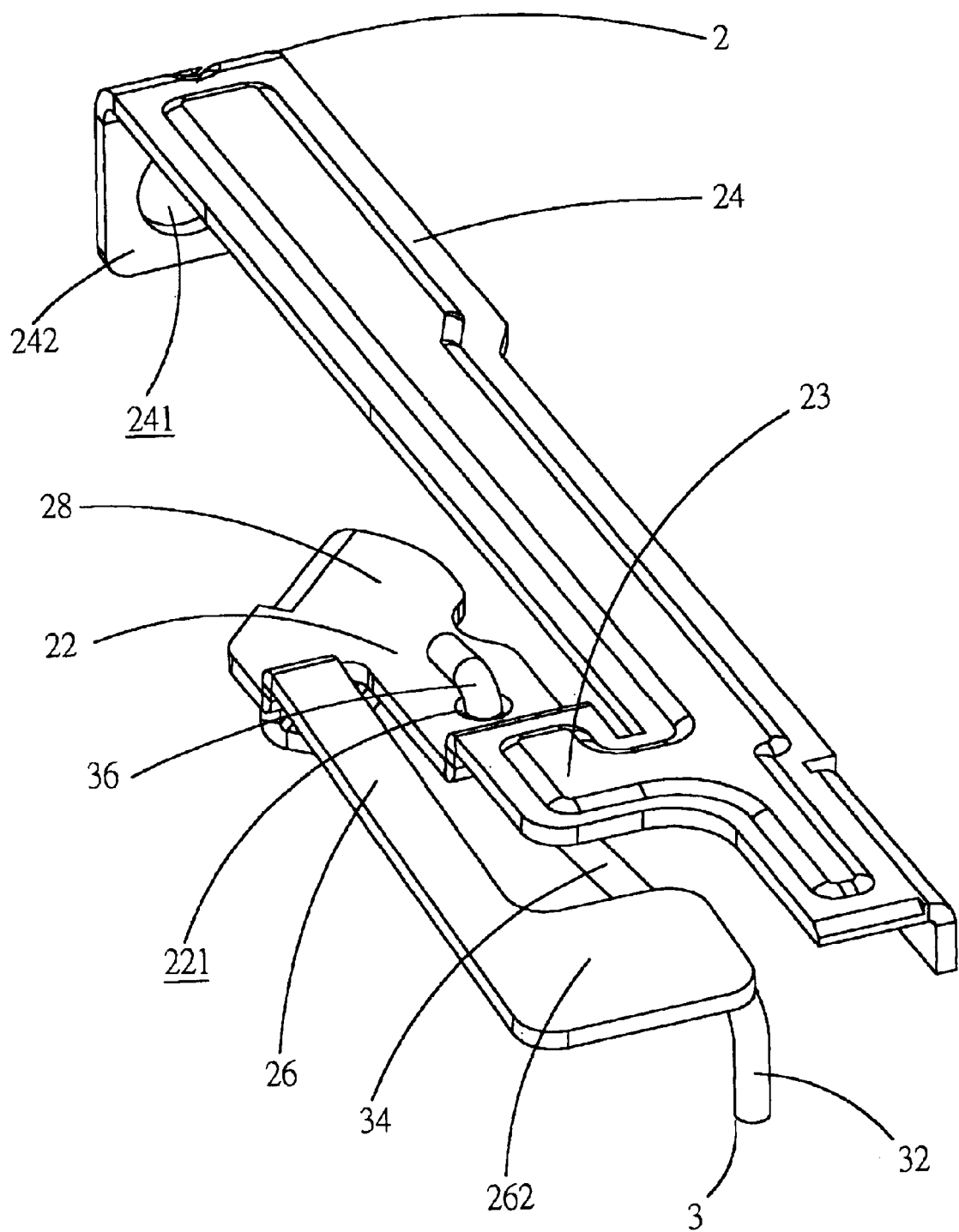
FIG. 5 is an assembled perspective view of a slider and a slider pin utilized in the two-stage ejection mechanism of card connector shown in FIG. 1.

Then, together with reference to FIG. 5, the slider 2 includes a mating portion 22, a sliding arm 24 and a bridge portion 23 for connecting the mating portion 22 and the sliding arm 24 therebetween. The slider pin 3 is composed of a following portion 32, a pivoting portion 36 and an engaging portion 34 for connecting the following portion 32 and the pivoting portion 36 therebetween.

The sliding arm 24 is shaped with a spring pressed member which contacts and presses an end of the spring 4. In this embodiment of the present invention, the pressed member is composed of a sliding blade 242 and a sliding aperture 241. The sliding blade 242 is bent downwardly and vertically from a bottom end of the sliding arm 24. The sliding aperture 241 is formed on the sliding blade 242. A diameter of the sliding aperture 241 is between an internal diameter of the spring 4 and an external diameter of the supporting shaft 5, which allows the supporting shaft 5 passing through the sliding aperture 241 and prevents the spring 4 from bouncing off the sliding aperture 241.

Figure 4:
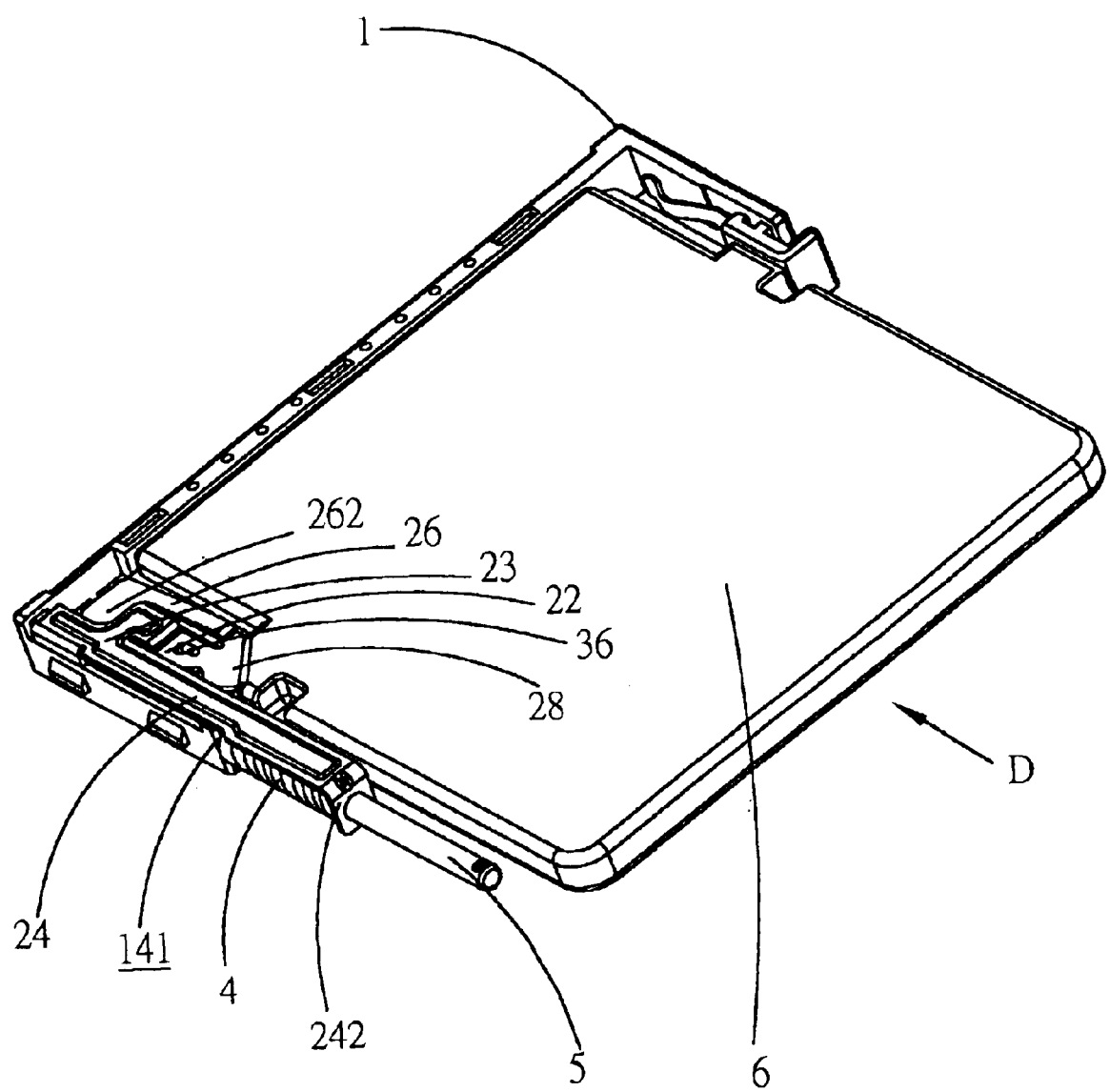
FIG. 4 is a perspective view showing a card loading status.

The mating portion 22 of the slider 2 shown in FIG. 5 is formed in its middle part with a pivoting aperture 221 which engages with the pivoting portion 36 of the slider pin 3. A card-engaged portion 28 is defined on a bottom end of the mating portion 22 to engage with the card 6 (as shown in FIG. 4). Further, the mating portion 22 extends from its front end along the card inserting direction D to define a spring pin 26. A free front end of the spring pin 26 extends against the sliding arm 24 to form a locking portion 262 which can contact and press elastically with the engaging portion 34 of the slider pin 3.

In the embodiment illustrated, the back and forth movement of the spring pin 3 in the cam groove 161 is stacked by the level and vertical motions. In order to prevent the slider pin 3 from rising upwardly to depart from the cam groove 161, the spring pin 26 of the slider 3 should have provided a reasonable elasticity, so that the slider pin 3 could move easily up and down without deformation and departing from the cam groove 161. On the other hand, the locking portion 262 of the spring pin 26 should have had a reasonable width, so that the locking portion 262 contacts and presses the slider pin 3 all the time in the process of the slider pin 3 moving in the cam groove 161.

Referring to FIGS. 1 and 2 again, as assembling the card connector of the present invention, the pivoting portion 36 of the slider pin 3 engages pivotally with the pivoting aperture 221, the engaging portion 34 contacts and presses with the locking portion 262, and the following portion 32 is located in the cam groove 161 of the cam member 16 which can move back and forth along the cam groove 161. A front end of the sliding arm 24 is hooked moveably on the guiding wall 14. The spring 4 is located between the sliding arm 24 and the guiding wall 14. The supporting shaft 5 passes through the sliding aperture 241, the spring 4 and the holding hole 141 along the card inserting direction D respectively, and is held fixedly in the holding hole 141 finally.

Figure 3:
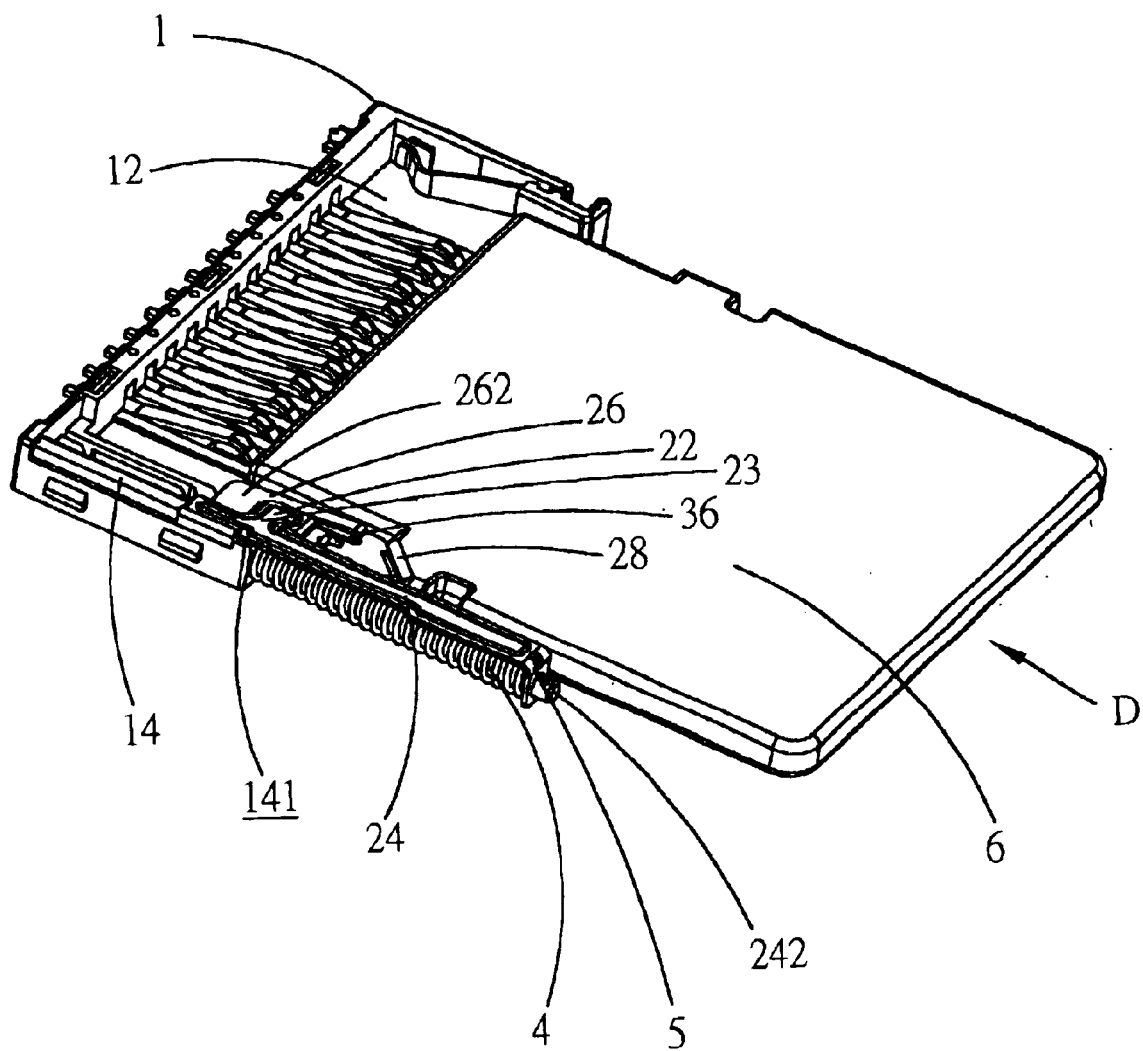
FIG. 3 is a perspective view showing a card unloading status.

Referring now to FIGS. 3 and 4, a process of loading or unloading the card 6 is detailed below. When the card 6 is inserted in the frame 1, as shown in FIG. 3, a lateral corner of the card front end is engaged with the card-engaged portion 28 of the slider 2. As pushing the card 6 for the first operation stage, the sliding arm 24 of the slider 2 slips through the guiding wall 14, which drives the sliding blade 242 slips onward, so the spring 4 is pressed to compress axially by the sliding blade 242. Simultaneously, the following portion 32 of the slider pin 3 moves onward along the cam groove 161, and is locked in the came groove 161 by means of the conventional design. In this way, the card 6 is fixed on a position as shown in FIG. 4.

As pushing the card 6 for the second operation stage, the interlocking connection between the following portion 32 of the slider pin 3 and the cam groove 161 is removed, and the compressed spring 4 begins to elongate. Further the sliding blade 242 slips backward through the pivoting shaft 5 in view of an elasticity of the spring 4, and the following portion 32 of the slider pin 3 moves backward along the cam groove 161 simultaneously. In this way, the card-engaged portion 28 of the slider 2 slides backward, so the card is withdrew form the frame 1, and to be placed on a position as shown in FIG. 3.

In the process of the two-stage ejection mechanism of card connector 100 of the present invention acting as described above, because the spring pin 26 contacts the slider pin 3 all the time, and acts a normal press force on the slider pin 3, the condition which the spring pin 26 rises upwardly to depart from cam groove 161 is avoided. In the embodiment illustrated, an obvious structure characteristic of the present invention is that the spring pin 26 is directly arranged on the slider 2. It is not required to provide the spring pin 26 by means of designing a new single mold to make or cleaving the shield to shape. Thereby the two-stage mechanism of card connector 100 of the present invention is provided with a simple structure and an easy assembling process. Meanwhile, it assures a reliable EMI performance resulted by the shield, and decreases apparently the making and assembling cost for the card connector of the present invention.

Although a particular embodiment of the invention has been described in detail for purposes of illustration, additional advantages and modifications will readily appear to those skilled in the art, and various modifications and enhancements may be made without departing from the spirit and scope of the invention. Accordingly, the invention is not to be limited except as by the appended claims.

What is claimed is:

1. A two-stage ejection mechanism of card connector comprising:

a frame in which a cam member is formed;

a slider which slips along a lateral side of the frame defining a mating portion for engaging with a card;

a slider pin which includes a pivoting portion, a following portion, and an engaging portion, the pivoting portion engaging pivotally with the slider, the following portion engaging moveably with the cam member and moving back and forth therein, the engaging portion connecting the following portion and the pivoting portion therebetween; and a spring located between the frame and the slider; wherein the slider further defining a spring pin, a free end of the spring pin extending a locking portion to contact and press the engaging portion of the slider pin.

2. The two-stage ejection mechanism of card connector as claimed in claim 1, wherein the cam member is formed with a cam groove for receiving the following portion of the slider pin and allow it moving back and forth therein.

3. The two-stage ejection mechanism of card connector as claimed in claim 1, wherein a guiding wall is formed on one lateral side of the frame to extend upwardly, and the slider slips along the guiding wall.

4. The two-stage ejection mechanism of card connector as claimed in claim 3, wherein the cam member is arranged to adjoin the guide wall on the frame.

5. The two-stage ejection mechanism of card connector as claimed in claim 3, wherein the slider is further formed with a sliding arm, a sliding blade is bent downwardly and vertically from a bottom end of the sliding arm, and the spring is fixed between the sliding blade and the guiding wall.

6. The two-stage ejection mechanism of card connector as claimed in claim 5, wherein the guiding wall opens a holding hole therein, and the sliding blade is formed with a sliding aperture thereon correspondingly.

7. The two-stage ejection mechanism of card connector as claimed in claim 6, further comprising a supporting shaft to pass through the sliding aperture, the spring and the holding hole in which the supporting shaft is held.

* * * * *